United States Patent
Nguyen

(10) Patent No.: US 7,671,304 B2
(45) Date of Patent: Mar. 2, 2010

(54) MULTIPLE ZONE TEMPERATURE CONTROLLER FOR INJECTION MOLDING SYSTEM

(75) Inventor: James Nguyen, Mississauga (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 1147 days.

(21) Appl. No.: 11/252,243

(22) Filed: Oct. 18, 2005

(65) Prior Publication Data

US 2006/0081719 A1    Apr. 20, 2006

Related U.S. Application Data

(60) Provisional application No. 60/619,039, filed on Oct. 18, 2004.

(51) Int. Cl.
   *H05B 1/02* (2006.01)
(52) U.S. Cl. ............... 219/483; 219/497; 219/486; 219/501; 700/202; 425/143; 425/547
(58) Field of Classification Search ........... 219/494, 219/497, 483–487, 501, 499, 505, 506, 211, 219/210; 425/144, 151, 547, 552, 143; 700/272, 700/202

See application file for complete search history.

(56) References Cited

U.S. PATENT DOCUMENTS

| | | | |
|---|---|---|---|
| 4,899,288 A | 2/1990 | Tsutsumi | |
| 5,772,933 A | 6/1998 | Kotzab | |
| 6,000,831 A | 12/1999 | Triplett | |
| 6,421,577 B1 | 7/2002 | Triplett | |
| 6,529,796 B1 | 3/2003 | Kroeger et al. | |
| 7,020,540 B2 | 3/2006 | Linehan et al. | |
| 2003/0154004 A1 | 8/2003 | Kroeger et al. | |
| 2004/0213867 A1* | 10/2004 | Kalantzis | 425/144 |
| 2004/0258787 A1 | 12/2004 | Olaru et al. | |
| 2004/0262813 A1 | 12/2004 | Pierick et al. | |
| 2006/0222347 A1* | 10/2006 | Wefler | 392/390 |

FOREIGN PATENT DOCUMENTS

| | | |
|---|---|---|
| CN | 2667541 Y | 12/2004 |
| JP | 64-71723 | 3/1989 |
| JP | 64-87319 | 3/1989 |
| JP | 1-257019 | 10/1989 |
| JP | 2-204017 | 8/1990 |
| JP | 9-150444 | 6/1997 |

* cited by examiner

*Primary Examiner*—Mark H Paschall
(74) *Attorney, Agent, or Firm*—Medler Ferro PLLC

(57) ABSTRACT

A multiple zone temperature controller for a hot runner injection molding system. The temperature controller includes inputs for signals from two or more thermocouples corresponding to two or more heating zones. The thermocouple inputs are time-division multiplexed and the output is amplified and input to a microcontroller. The microcontroller manages and controls operation of power switching stages for controlling the power supplied to heating elements corresponding to each of the heating zones. The multiplexer is a low impedance switch.

16 Claims, 3 Drawing Sheets

MULTIPLE ZONE TEMPERATURE CONTROLLER FOR INJECTION MOLDING SYSTEM

CROSS-REFERENCE TO RELATED APPLICATION

This application claims the benefit of U.S. Provisional Application No. 60/619,039, filed Oct. 18, 2004, which is incorporated by reference herein in its entirety.

FIELD OF THE INVENTION

The present invention relates to temperature control in an injection molding system.

BACKGROUND OF THE INVENTION

Hot runner systems are becoming more compact and economical. The nozzles are being designed to have smaller mass and higher watt density. The heating elements and manifolds are also becoming smaller and more compact.

Temperature controllers typically used in connection with hot runner systems are designed to have a single PCB card dedicated to one zone, wherein a zone relates to one thermocouple and its corresponding heating element. Accordingly, a six zone system would require six single zone controller cards. The controller cards are often housed in a single controller box. A typical six zone controller box is about 350 mm×150 mm×500 mm, wherein each single zone controller card has dimensions of about 100 mm×120 mm×50 mm.

With the reduction in size of many of the other components in a hot runner system, it would be desirable to reduce the size of the controller. In providing a more compact temperature controller, it would be advantageous if the compact temperature controller is designed to operate with smaller tips or nozzles, is easy to operate, and is economical to produce.

SUMMARY OF THE INVENTION

The present invention provides a multiple zone temperature controller for a hot runner injection molding system. The temperature controller includes inputs for signals from two or more thermocouples corresponding to two or more heating zones. The thermocouple inputs are time-division multiplexed and the output is amplified and input to a microcontroller. The microcontroller manages and controls operation of power switching stages for controlling the power supplied to heating elements, which correspond to each of the heating zones. The multiplexer is a low impedance switch In one aspect, the present invention provides a multiple zone temperature controller for use in an injection molding system, the injection molding system having at least two zones, each zone having a heating element and having a thermocouple for measuring temperature in the zone. The temperature controller includes a PCB card having at least two input ports each for receiving temperature signals from one of the thermocouples and having at least two output ports each for driving one of the heating elements. It also includes a multiplexer coupled to the input ports for selecting one of the temperature signals and a processor mounted on the PCB card and having an input pin for receiving the one of the temperature signals and outputting a heater control signal in response to the one of the temperature signals and a preset value. The temperature controller further includes at least two power switching stages, each power switching stage being coupled to one of the heating elements and supplying the one of the heating elements with a driving current, each driving current being controlled by one of the heater control signals, and a user interface for displaying data from the processor and for receiving input data from a user so as to establish the preset values.

In another aspect, the present invention provides a multiple zone temperature controller for use in an injection molding system. The injection molding system has at least two zones, and each zone has a heating element and has a thermocouple for measuring temperature in the zone. The temperature controller includes a card means for receiving temperature signals from each of the thermocouples and outputting at least two driving signals to each of the heating elements, a multiplexing means mounted to the card means for receiving each of the temperature signals and for selecting one of the temperature signals, and a processing means mounted on the card means for receiving the selected temperature signal and for outputting a heater control signal in response to the selected temperature signal and a preset value. The temperature controller also includes at least two power switching means, each power switching means supplying the one of the driving signals, each the driving signal being controlled by the power switching means in response to the heater control signal, and a user interface means for displaying data from the processor and for receiving input data from a user so as to establish the preset value.

Other aspects and features of the present invention will be apparent to those of ordinary skill in the art from a review of the following detailed description when considered in conjunction with the drawings.

BRIEF DESCRIPTION OF THE DRAWINGS

Embodiments of the present invention will now be described more fully with reference to the accompanying drawings in which like reference numerals indicate similar structure.

DETAILED DESCRIPTION OF THE INVENTION

Figure 1:
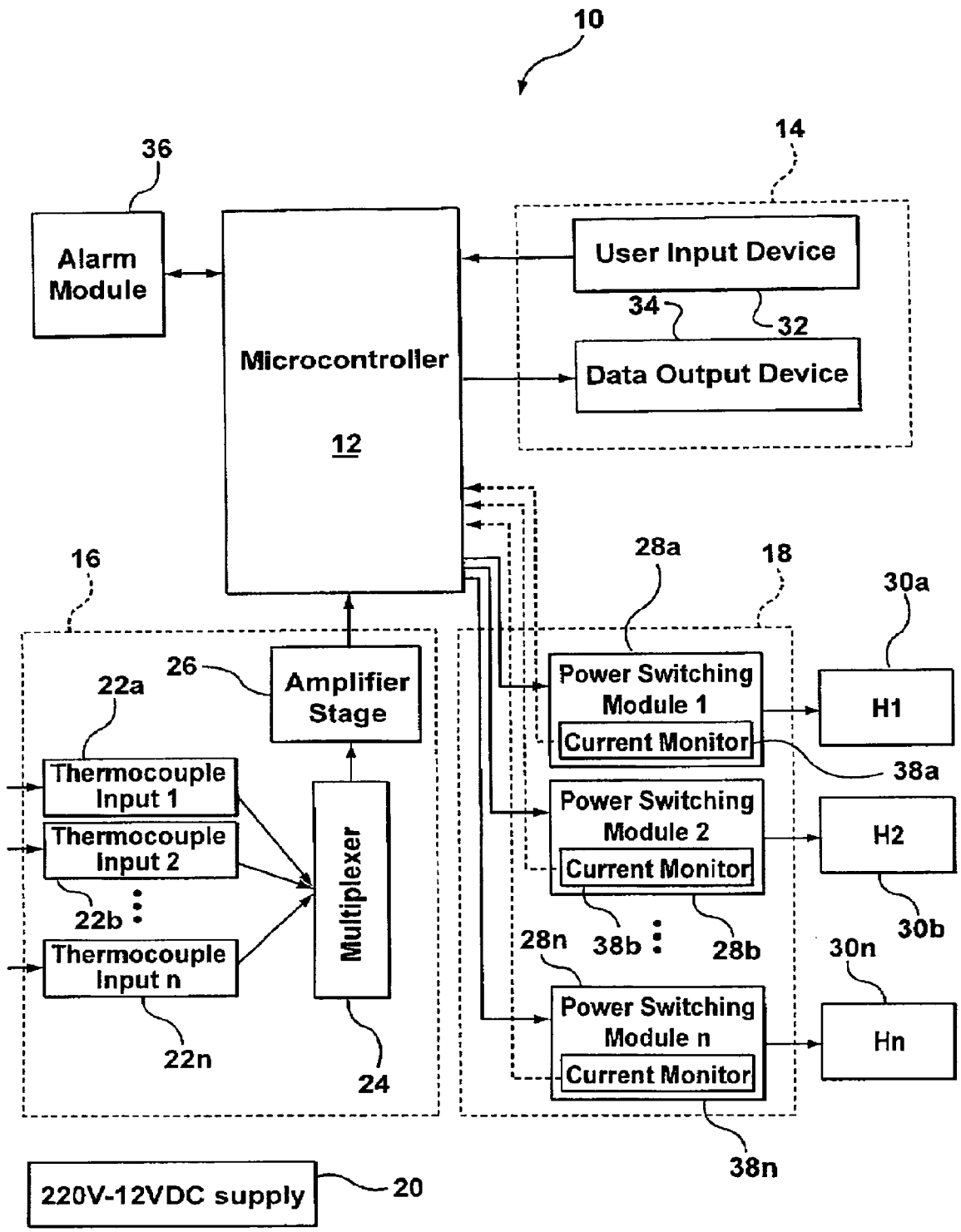
FIG. 1 shows a block diagram of a temperature controller for use in controlling a hot runner injection molding system.

Reference is first made to FIG. 1, which shows a block diagram of a temperature controller 10 for use in controlling a hot runner injection molding system. The temperature controller 10 includes a microcontroller 12, a user interface 14, a temperature sensing system 16, and a power switching stage 18. The temperature controller 10 receives input power from a high voltage source and may include a step-down converter 20 for low voltage supply.

The temperature sensing section 16 includes more than one thermocouple input (shown individually as 22a, 22b, . . . , 22n), each for receiving an input signal from a thermocouple within the hot runner system. Each thermocouple corresponds to a "zone". The thermocouple inputs 22 are all connected to a multiplexer 24. The multiplexer 24, under control of the microcontroller 12, selects one of the thermocouple inputs 22 and inputs it to an amplifier stage 26. The amplifier stage 26 performs amplification and, in some embodiments, signal conditioning on the selected thermocouple input signal. The amplified signal is then input to the microcontroller 12. By employing time-division multiplexing of input signals, the temperature controller 10 is capable of operating with a single low cost amplifier and a microcontroller having fewer input pins.

The power switching stage 18 includes more than one power switching module (shown individually as 28a, 28b, ..., 28n). Each power switching module 28 is coupled to a heating element (shown individually as 30a, 30b, ..., 30n) within the hot runner system. Typically, each heating element 30 is located in one of the zones and has a corresponding thermocouple sensor in the same physical zone. Each power switching module 28 switches a high-power high-current driving signal to control operation of the heating element and thereby control the temperature of each of the zones in the hot runner system. Each power switching module 28 receives a power control signal from the microcontroller 12 and operates under control of the power control signal.

Each power switching stage 18 may further include a current monitor (shown individually as 38a, 38b, ..., 38n) for measuring and monitoring the current flowing in the heating element. The current monitors 38 each output a current measurement signal to the microcontroller 12. In one embodiment the current monitors 38 comprise Hall sensors. The Hall sensors are each coupled to a signal conditioning and amplification stage, which outputs the current measurement signal to the microcontroller 12.

The user interface 14 may include a user input device 32 and a data output device 34. The user input device 32 may include buttons, a keypad, touch screen, keyboard, or any other mechanism for entering user selections and/or set points. The data output device 34 may include a display screen, readout, printer, LEDs, or any other mechanisms for outputting data to a user regarding the state of the system, various temperature readings, and/or user set points. In one embodiment, the data output device 34 includes a display element for each zone.

The temperature controller 10 may further include an alarm module 36 operating under control of the microcontroller 12. Certain preset conditions, thresholds, or other triggers may cause the microcontroller 12 to output an alarm signal to the alarm module 36. The alarm module 36 may indicate an alarm condition through an auditory, visual, and/or kinetic indicator, such as a siren, buzzer, lights or other mechanisms. The alarm module 36 may also include a output communication stage for communicating the alarm signal to other temperature controllers or to one or more external devices.

The microcontroller 12 includes a processor and memory. The processor operates under stored program control. The microcontroller 12 functions to read the temperature sensed by the thermocouples and to adjust the heating of the various zones in the injection molding apparatus accordingly. Adjustments to the heating may be based upon predetermined thresholds or set points. For example, a zone may have a minimum temperature and a maximum temperature. The microcontroller 12 determines whether the measured temperature in the zone exceeds this minimum or maximum temperature and makes a corresponding adjustment to the power and/or current supplied to the heating element for the zone. The tolerance required is typically ±1° C.

The microcontroller 12 may, in one embodiment, control the current and/or power supplied to individual heaters through outputting pulse width modulated (PWM) control signals to each power switching module 28. The power switching modules 28 then switch the high voltage supply in accordance with the PWM control signals.

In one embodiment, the microcontroller 12 comprises an 8-bit controller with built-in analog-to-digital converter and built in EEPROM and an internal clock. In one embodiment, the microcontroller 12 comprises an 8 bit AT Mega 64 microcontroller, produced by Atmel Corporation of San Jose, Calif. Those of ordinary skill in the art will appreciate that other microcontrollers may be used. With more than two zones, it may be advantageous to employ a 16-bit microcontroller. One may also provide for an external clock for increasing the microcontroller speed.

The multi-zone temperature controller 10 is assembled on a single PCB card. Multiple temperature controllers 10 may be used in concert in a single temperature controller box to control a hot runner system having a large number of zones. A typical box may contain six cards. If the temperature controller 10 controls two zones, then a typical box may service at least twelve zones. In one embodiment, the PCB comprises FR4-600 high temperature fiberglass PCB material. To support the high power switching and currents in the power switching stage 18, the PCB may employ double traces having a width of at least 0.1 inches. Each power switching module 28 may switch a driving signal having a current of about 15 A. The power switching modules 28 may include an isolated 600 V, 40 A triac and isolated anodized heat sink.

Figure 2:
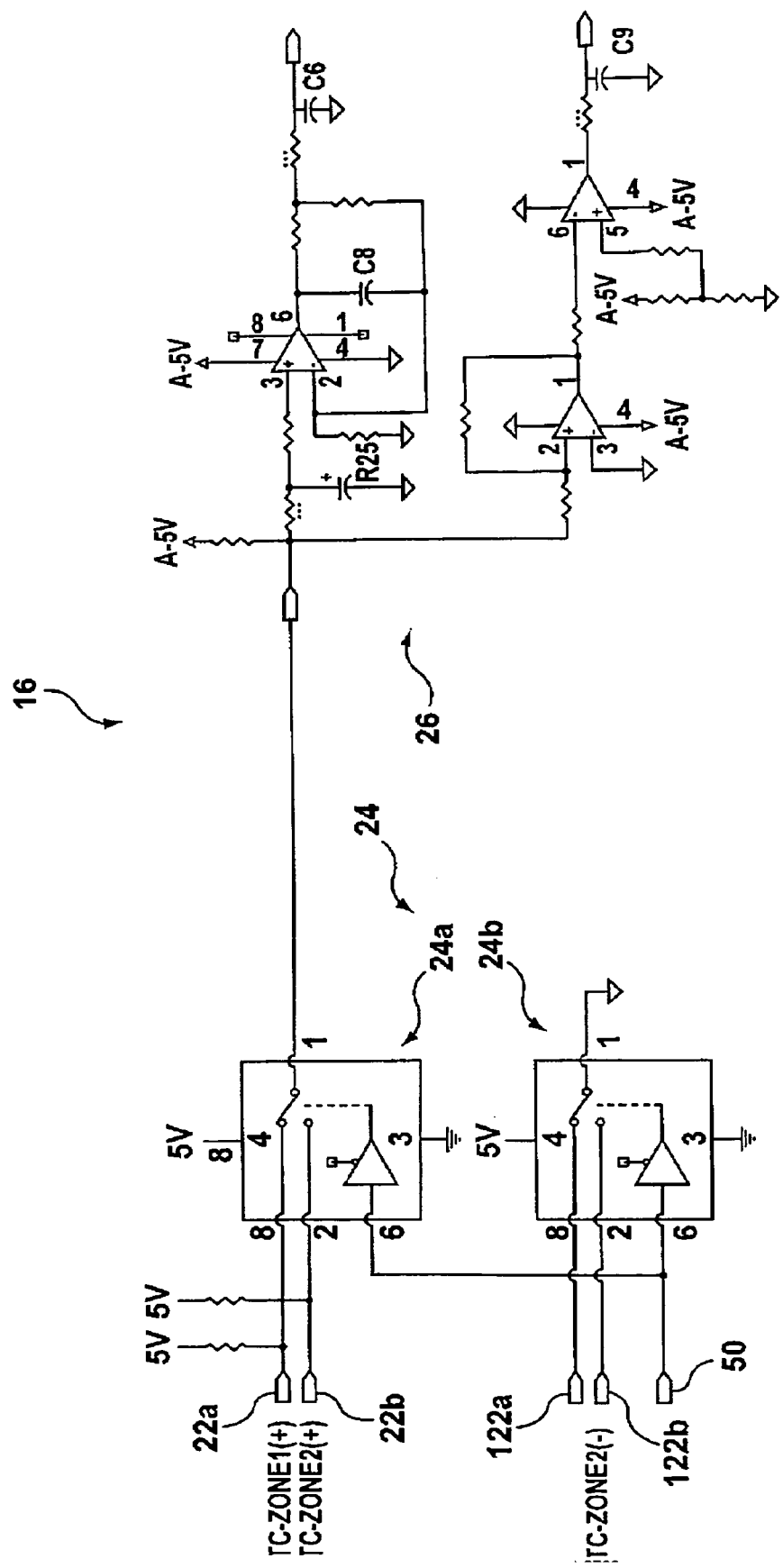
FIG. 2 shows a circuit diagram of an embodiment of a temperature sensing system.

Reference is now made to FIG. 2, which shows a circuit diagram of an embodiment of the temperature sensing system 16. The temperature sensing system 16 includes the thermocouple inputs 22 (two are shown as 22a and 22b), the multiplexer 24, and the amplifier stage 26. The multiplexer 24 includes a signal-switching multiplexer 24a and a parallel ground-switching multiplexer 24b. The ground-switching multiplexer 24b is for switching a ground contact for each thermocouple to ground in sync with the coupling of the input signals to the amplifier stage 26. Accordingly, the input ports of the ground-switching multiplexer 24b are connected to thermocouple ground contacts 122a and 122b.

The thermocouple inputs 22a, 22b, provide the thermocouple input signals to the input ports on the signal-switching multiplexer 24a. The multiplexers 24a and 24b operate under control of a selection signal 50 from the microcontroller 12.

The thermocouples comprise, in one embodiment, J-type grounded thermocouples. The current received at the input ports of the signal-switching multiplexer 24a may have a magnitude of only a few microAmps. To accommodate these low signal levels, the multiplexer 24 comprises a fast and efficient low impedance multiplexer. In one embodiment, the switch impedance is less than 1 Ohm.

The selected signal is output from the signal-switching multiplexer 24a to the amplifier stage 26. The amplifier stage 26 comprises a low cost operational amplifier configuration.

Figure 3:
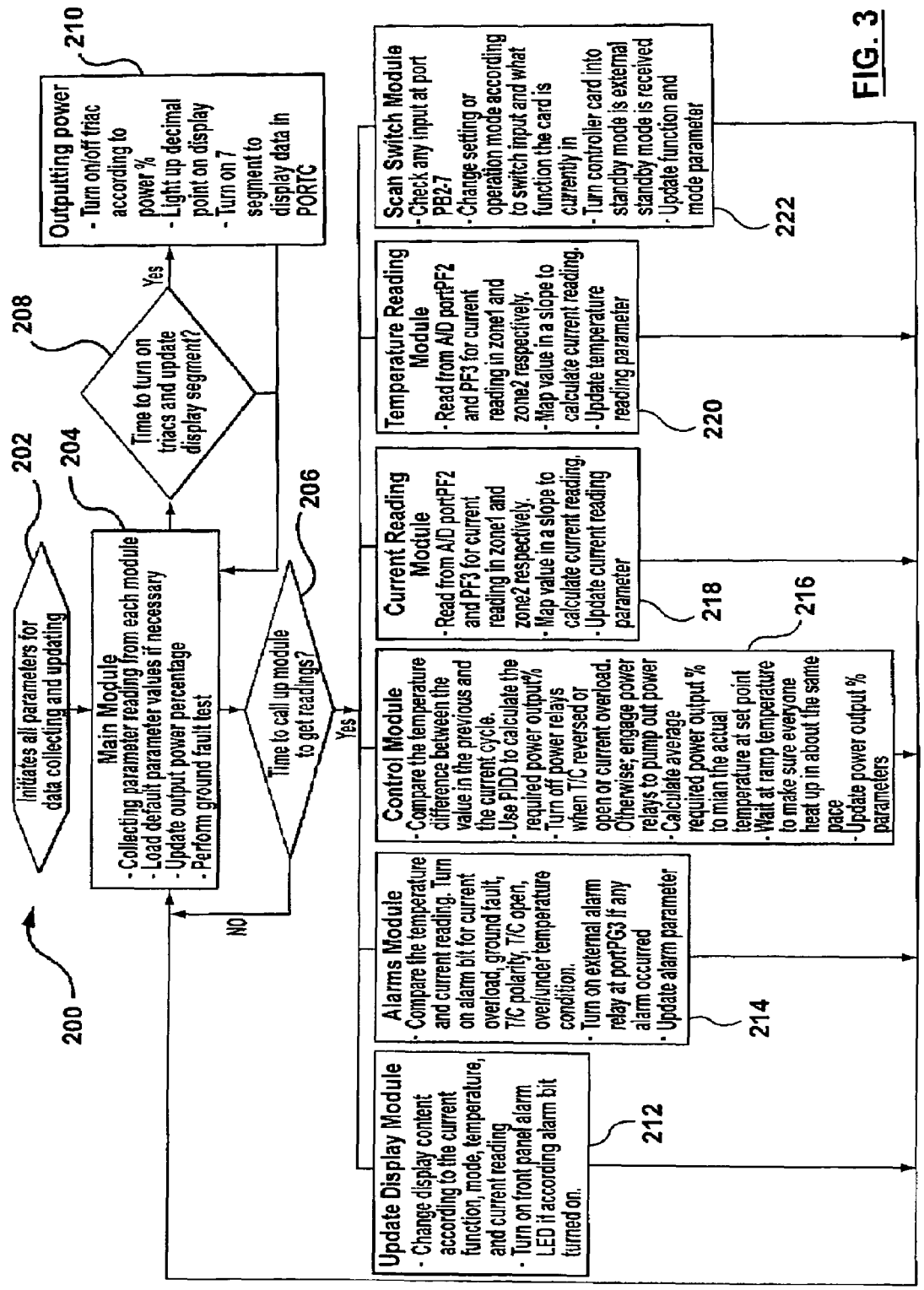
FIG. 3 shows, in flowchart form, a method of controlling temperature for multiple zones in a hot runner system.

Reference is now made to FIG. 3, which shows, in flowchart form, a method 200 of controlling temperature for multiple zones in a hot runner system.

The method 200 begins with initialization of the system parameters in block 202. Block 204 represents the main operating module for the temperature controller 10 (FIG. 1). The main operating module updates power output percentages in accordance with readings collected from the various sensors and it monitors/manages the timing of the multiplexed readings and power control operations. Blocks 206 and 208 show the main operating module monitoring the time between sensor readings and power output control. At predetermined intervals, the timing triggers operation of the power output module shown in block 210. The power output module generates or controls the power control signals that are output to the power switching modules 28 (FIG. 1). The power output module 210 also updates display information on the user interface 14 (FIG. 1).

At predetermined intervals, the timing triggers operation of sensor reading operations. Blocks 212 to 222 represent modules for performing sensor reading and related functions. Block 212 corresponds to the operations of an update display module for updating information shown on the data output device 34 (FIG. 1). The current reading module (block 218) and the temperature reading module (block 220) read the current and temperature measurements, respectively, and update stored values. The control module (block 216) updates power output parameters based upon the current and temperature readings collected. The alarms module (block 214) compares readings with various preset thresholds for detecting any alarm conditions. Alarms are triggered if measured values exceed one or more preset thresholds. The scan switch module (block 222) assesses whether there has been a change triggered in operating mode or settings.

It will be appreciated by those of ordinary skill in the art that the modules described in conjunction with FIG. 3 may comprise separate modules or parts of one or more modules. Such modules may be implemented by way of a microcontroller operating under stored software program control. The suitable programming of such a device will be within the understanding of a person of ordinary skill in the art having regard to the description herein. Software programs may be stored in firmware or other memory elements accessible to the processor within the microcontroller.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A multiple zone temperature controller for use in an injection molding system, the injection molding system having at least two zones, each zone having a heating element and having a thermocouple for measuring temperature in the zone, the temperature controller comprising:
    a PCB having at least two input ports each for receiving temperature signals from one of the thermocouples and having at least two output ports each for driving one of the heating elements;
    a multiplexer mounted on said PCB coupled to said input ports for selecting one of said temperature signals;
    a processor mounted on said PCB and having an input pin for receiving said selected temperature signal from said multiplexer and outputting a heater control signal in response to said selected temperature signal and a preset value, wherein said processor outputs a switch signal and said multiplexer includes a control port for receiving said switch signal and switching between said input ports in response to said switch signal;
    at least two power switching stages mounted on said PCB, each power switching stage being coupled to one of said heating elements and supplying said one of said heating elements with a driving current, each said driving current being controlled by one of said heater control signals; and
    a user interface for displaying data from said processor and for receiving input data from a user so as to establish said preset value.

2. The multiple zone temperature controller claimed in claim 1, wherein said multiplexer comprises a low impedance multiplexer.

3. The multiple zone temperature controller claimed in claim 2, wherein said low impedance multiplexer includes a switching impedance of less than one Ohm.

4. The multiple zone temperature controller claimed in claim 1, wherein said PCB includes at least two ground input ports each connected to a ground contact on a respective one of the thermocouples, wherein said multiplexer is further connected to said ground input ports, and wherein said multiplexer switches between said ground input ports in response to said switch signal.

5. The multiple zone temperature controller claimed in claim 4, wherein said multiplexer comprises a signal-switching multiplexer for selectively coupling one of said input ports to a signal output port in response to said switch signal, and a ground-switching multiplexer for selectively coupling one of said ground input ports to a ground connection in response to said switch signal, said signal output port outputting said selected temperature signal to said processor.

6. The multiple zone temperature controller claimed in claim 5, further including an amplification and signal conditioning stage mounted on said PCB and connected to said signal output port for receiving said selected temperature signal, amplifying and conditioning said selected temperature signal, and outputting a conditioned temperature signal to said processor.

7. The multiple zone temperature controller claimed in claim 1, wherein said switch signal implements time-division multiplexing of said temperature signals.

8. The multiple zone temperature controller claimed in claim 1, wherein said PCB comprises high temperature fiberglass.

9. A multiple zone temperature controller for use in an injection molding system, the injection molding system having at least two zones, each zone having a heating element and having a thermocouple for measuring temperature in the zone, the temperature controller comprising:
    a card means for receiving temperature signals from each of the thermocouples and outputting at least two driving signals to each of the heating elements;
    a multiplexing means mounted to said card means for receiving each of the temperature signals and for selecting one of said temperature signals;
    a processing means mounted on said card means for receiving said selected temperature signal and for outputting a heater control signal in response to said selected temperature signal and a preset value, said processing means for outputting a switch signal, and wherein said multiplexing means includes means for switching between said temperature signals in response to said switch signal;
    at least two power switching means mounted on said card means, each power switching means supplying said one of said driving signals, each said driving signal being controlled by said power switching means in response to said heater control signal; and
    a user interface means for displaying data from said processor and for receiving input data from a user so as to establish said preset value.

10. The multiple zone temperature controller claimed in claim 9, wherein said multiplexing means comprises means for low impedance switching between said temperature signals.

11. The multiple zone temperature controller claimed in claim 10, wherein said means for low impedance switching includes a switching means having an impedance of less than one Ohm.

12. The multiple zone temperature controller claimed in claim 9, wherein said card means includes means for connecting to a ground contact on each of the thermocouples, and wherein said multiplexing means includes means for switching between said ground contacts in response to said switch signal.

13. The multiple zone temperature controller claimed in claim 12, wherein said multiplexing means comprises a signal-switching multiplexer means for selectively coupling one of said temperature signals to a signal output port in response to said switch signal, and a ground-switching multiplexer means for selectively coupling one of said ground contacts to a ground connection in response to said switch signal, said signal output port outputting said selected temperature signal to said processing means.

14. The multiple zone temperature controller claimed in claim 13, further including an amplification and signal conditioning means mounted on said card means and connected to said signal output port for receiving said selected temperature signal, amplifying and conditioning said selected temperature signal, and outputting a conditioned temperature signal to said processing means.

15. The multiple zone temperature controller claimed in claim 9, wherein said switch signal implements time-division multiplexing of said temperature signals.

16. The multiple zone temperature controller claimed in claim 9, wherein said card means comprises high temperature fiberglass.

* * * * *